UNITED STATES PATENT OFFICE 2,654,667

SULFOXIDES AS PLANT DEFOLIANTS

Lyle D. Goodhue, Bartlesville, Okla., and Carolyn E. Tissol, Minneapolis, Minn., assignors to Phillips Petroleum Company, a corporation of Delaware No Drawing. Application November 29, 1950,
Serial No. 198,224

19 Claims. (Cl. 71—2.3)

This invention relates to the use of organic sulfoxides and disulfoxides as defoliating agents for plants which in the normal course of nature shed their leaves seasonally as when mature. Herein and in the claims the plants intended are those to which reference has just been made. Plants which are within the term of this disclosure and the claims are naturally deciduous and are, by way of example, cotton, bean, plants of the family *geraniaceae*, many shade trees and the like.

We have now discovered that organic sulfoxides and disulfoxides are excellent plant defoliating agents. These compounds may be represented by the following general formulae:

(1)

and (2)
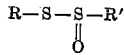

wherein R and R' may be alkyl, cycloalkyl, aryl, alkaryl or aralkyl groups containing not more than 12 carbon atoms, may be alike or different and $m$ is an integer from the group of 1 and 2.

Methods for the production of these compounds are well known in the art. One method for the preparation of a compound represented by Formula 1 above wherein R and R' are phenyl groups and $m$ is 1, namely diphenyl sulfoxide, comprises treating benzene with thionyl chloride in the presence of a Friedel-Crafts catalyst such as aluminum chloride.

Typical compounds applicable to the present invention include diphenyl sulfoxide, dibenzyl sulfoxide, di-n-butyl sulfoxide, di-isopropyl sulfoxide, diethyl sulfoxide, dimethyl sulfoxide, di-tert-hexyl sulfoxide, di-n-dodecyl sulfoxide, o-(phenylsulfinyl)-aniline

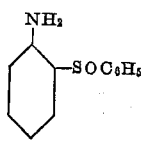

ethyl sulfinyl mercapto ethane

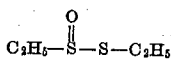

and the like.

These compounds are effective defoliants when applied to plants in any suitable form such as solutions, dusts, aerosols, fogs and the like. The compounds of the present invention which are liquids are generally more effective when applied as solutions rather than as dusts. However, it is within the scope of the present invention to apply them as dusts. When fogging methods are employed, temperatures in fog generating devices or the like should be insufficient to cause possible decomposition of the present defoliants. We have found that it is convenient to apply a sulfoxide of the class disclosed as a solution in a suitable solvent such as kerosene, diesel oil or the like. The compounds of the present invention are also advantageously adaptable for application by aircraft as dusts, fogs, or other suitable form such as produced by high velocity air jet devices.

Any suitable carrier or solvent may be employed which is inert with respect to the active defoliating agent and which will not have a harmful effect on plants to which applied. Of course, solvents which display defoliant activity may be advantageously employed to provide an adjuvant effect to the present compounds. Examples of suitable solvents include kerosene, diesel fuel, fuel oil, isoparaffinic or paraffinic hydrocarbons and the like. Talc, kieselguhr, clays, calcium carbonate, and other inert carriers may be used when preparing dusts. Water may be used advantageously to form emulsions of said compounds suitable for spraying. When preparing aqueous emulsions, wetting or emulsifying agents such as soap, Triton X100 (alkyl aryl polyether alcohol), Dresinate 731 (sodium salt of a disproportionated rosin acid), Tween 20 (sorbitan monolaurate polyethylene oxide) and the like are employed in sufficient amount to stabilize the emulsions. Emulsifying agents should of course be of such nature that they do not react to destroy the effect of the present sulfoxides or produce a harmful effect on crops or plants to which applied. Emulsions or solutions containing from 0.05 to ten per cent by weight of the active sulfoxide are preferred.

The amount of sulfoxide or disulfoxide applied will be in the range from 0.5 to 20 pounds per acre, preferably 2 to 5 pounds per acre. Of course, larger amounts than 20 pounds per acre may be employed if desired.

EXAMPLE I

Laboratory defoliation tests were made on black wax bean plants which were two weeks old. Solutions of varying concentrations of diphenyl sulfoxide were prepared employing a mixture of equal portions of acetone and deodorized kerosene as a non-phytotoxic solvent. Applications of the various solutions were made with a microsyringe. The dosage per leaf was 0.05 ml. of solution. Results of the tests are recorded below:

*Defoliation of bean plants using 0.05 ml. of a 1 to 1 hydrocarbon-acetone solution per leaf on four bean leaves*

| Concentration of Diphenyl Sulfoxide, percent | 24 Hour Injury | Leaves Off After X Days | | | | | Final Defoliation, percent |
|---|---|---|---|---|---|---|---|
| | | 2 Days | 3 Days | 4 Days | 6 Days | 8 Days | |
| 0.12 | Moderate | 4 | | | | | 100 |
| .25 | Slight | 4 | | | | | 100 |
| .5 | Moderate | 3 | 4 | | | | 100 |
| 1.0 | Very Severe | | | | | 4 | 100 |

EXAMPLE II

Laboratory defoliation tests were run on bean plants using the following compounds. For convenience these compounds will be referred to hereinafter by the letters A and B.

A. A reaction mixture containing 35 per cent sulfoxide.[1] This mixture was prepared as follows: 50 grams of di-tert-hexyl disulfide, 200 gms. of acetone and 12.5 gms. of 29 per cent aqueous hydrogen peroxide were placed in a quart bottle and allowed to stand for 10 days at room temperature. At the end of this period the acetone was removed. Two phases remained, namely an aqueous phase and an oily phase containing the sulfoxide and unreacted disulfide. The oily layer was recovered and employed for defoliation tests. Deperoxidation of residual peroxide was effected by allowing the product to stand for three months before use.

B. A reaction mixture containing 50 per cent of sulfoxide[1]. This mixture was prepared according to the method described for the preparation of product A using 25 grams of peroxide, all other factors remaining the same.

Solutions of varying concentrations of these materials were prepared using HF heavy alkylate ---
[1] Sulfoxide content was determined by analyzing a sample of the reaction effluent for unreacted hydrogen peroxide. It was assumed that the peroxide consumed, by difference, was completely utilized in the formation of sulfoxide. The method for determining unconsumed peroxide is fully described by C. D. Wagner et al., "Determination of Organic Peroxides," Industrial and Engineering Chemistry, Analytical Edition, vol. 19, No. 12, December, 1947, pages 976-979 inclusive. The sulfoxide was almost entirely di-tertiary-hexyl sulfoxide.

--- as a non-phytotoxic solvent. Application was made with a microsyringe. The dosage was 0.05 ml. of solution per leaf. Results of the tests are recorded below:

*Defoliation of bean plants using 0.05 ml. of an HF heavy alkylate\* solution per leaf on four bean leaves*

| Compound | Concentration | Leaves Off After X Days | | | | | | Final Percent Defoliation |
|---|---|---|---|---|---|---|---|---|
| | | 2 Days | 4 Days | 5 Days | 8 Days | 9 Days | 11 Days | |
| A | 1.0 | 4 | | | | | | 100 |
| A | .5 | 4 | | | | | | 100 |
| A | .25 | 4 | | | | | | 100 |
| A | .12 | | | 1 | | 2 | | 50 |
| B | 1.0 | 2 | 4 | | | | | 100 |
| B | .5 | 2 | 4 | | | | | 100 |
| B | .25 | 4 | | | | | | 100 |
| B | .12 | 1 | | 2 | 3 | | 4 | 100 |

*The HF heavy alkylate employed comprised a typical reaction effluent from a hydrogen fluoride catalyzed alkylation of paraffins with olefins to produce isoparaffinic hydrocarbons. The sample employed herein had a boiling range of 384° to 569° F. corrected to 29.92 inches of mercury.

EXAMPLE III

A defoliation test was conducted wherein .05 ml. of a one per cent solution of diphenyl sulfoxide in deodorized kerosene was applied to each of five leaves of a mature cotton plant. One hundred per cent defoliation was effected two days after application.

EXAMPLE IV

Defoliation tests were run on mature cotton plants using aqueous emulsions of diphenyl sulfoxide and compound B (identified in Example II above). Aqueous emulsions of varying concentrations of these materials were prepared using Triton X100 (alkyl aryl polyether alcohol) as the emulsifying agent. Two commercial defoliants, namely sodium 3,6-endoxyhexahydrophthalate and sodium cyanamide were applied as aqueous solutions for comparative purposes. Application was made by spraying until the leaves of the cotton plants were wet, a minimum amount running therefrom. Results of the tests are recorded below:

| Compound | Concentration of Solution or Emulsion, percent | Leaves Off After X Days | | | | | | | | | Total Leaves Treated | Final Percent Defoliation |
|---|---|---|---|---|---|---|---|---|---|---|---|---|
| | | 1 Day | 2 Days | 3 Days | 4 Days | 5 Days | 6 Days | 7 Days | 8 Days | 9 Days | 12 Days | | |
| Diphenyl Sulfoxide | 1 | | | | 4 | | 8 | 12 | | 17 | 18 | 21 | 22 | 95 |
| Recycle Gas\* Oil | 9 | | | | | | | | | | | | | |
| Diphenyl Sulfoxide | 0.5 | | | 11 | | 22 | | 23 | | | | 24 | 96 |
| Recycle Gas Oil | 5.0 | | | | | | | | | | | | |
| B | 1 | | | 6 | 13 | 16 | 21 | | | | | 22 | 95 |
| Recycle Gas Oil | 9 | | | | | | | | | | | | |
| Sodium 3,6-Endoxy Hexahydrophthalate | 1 | 3 | 5 | | | | 6 | 7 | | | 7 | 18 | 38 |
| Sodium Cyanamide | 1 | | 13 | | | | | 15 | | | 15 | 26 | 58 |

\*Recycle gas oil was employed as an adjuvant; it appears to enhance the activity of diphenyl sulfoxide.

It is possible that some sensitive persons may develop skin irritations when working with one or more of the compounds according to the invention. Accordingly, the usual precautions should be taken to determine toxicity to humans in any particular case.

Reasonable variation and modification are possible within the scope of the foregoing disclosure and the appended claims to the invention the essence of which is that organic sulfoxides and disulfoxides have been found to be excellent defoliating agents for plants which, in the normal course of nature, shed their leaves seasonally or when mature.

We claim:

1. A method for defoliating a plant which comprises applying to said plant in a concentration and amount effective to cause its defoliation a compound from the group of compounds which can be represented by the general formulae (1)

and (2)

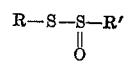

wherein R and R' are selected from the group consisting of the non-halogen containing radicals alkyl, cycloalkyl, aryl, alkaryl and aralkyl groups containing not more than 12 carbon atoms and $m$ is an integer from the group of 1 and 2.

2. A method for defoliating a plant which comprises applying to said plant in a concentration and amount effective to cause its defoliation diphenyl sulfoxide.

3. A method for defoliating a cotton plant which comprises applying to said plant in a concentration and amount effective to cause its defoliation diphenyl sulfoxide.

4. A method for defoliating a plant which comprises applying to said plant in a concentration and amount effective to cause its defoliation di-tertiary-hexyl sulfoxide.

5. A method for defoliating a cotton plant which comprises applying to said plant in a concentration and amount effective to cause its defoliation di-tertiary-hexyl sulfoxide.

6. A plant defoliant containing a minor proportion of diphenyl sulfoxide and a major proportion of a recycle gas oil, said defoliant being adapted to application by extending it with a suitable carrier.

7. A method for defoliating a plant which comprises applying to said plant in a concentration and amount effective to cause its defoliation di-n-butyl sulfoxide.

8. A method for defoliating a plant which comprises applying to said plant in a concentration and amount effective to cause its defoliation di-n-dodecyl sulfoxide.

9. A method for defoliating a plant which comprises applying to said plant in a concentration and amount effective to cause its defoliation di-isopropyl sulfoxide.

10. A plant defoliant containing a minor proportion of a compound from the group of compounds which can be represented by the general formulae (1)

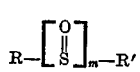

and (2)

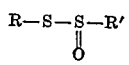

wherein R and R' are selected from the group consisting of the non-halogen containing radicals alkyl, cycloalkyl, aryl, alkaryl and aralkyl groups containing not more than 12 carbon atoms and $m$ is an integer from the group of 1 and 2 in admixture with a hydrocarbon carrier selected from the group consisting of recycle gas oil, diesel fuel, fuel oil, and a substantially completely isoparaffinic solvent.

11. A plant defoliant according to claim 10 in which the said hydrocarbon is selected from the group consisting of diesel fuel, fuel oil, and isoparaffinic hydrocarbons.

12. A plant defoliant composition containing diphenyl sulfoxide dissolved in a hydrocarbon solvent carrier selected from the group consisting of recycle gas oil, diesel fuel, fuel oil, and a substantially completely isoparaffinic solvent in a concentration sufficient that upon application of the composition the said sulfoxide is effective to cause defoliation.

13. A plant defoliant composition containing di-tert-hexyl sulfoxide dissolved in a hydrocarbon solvent carrier in a concentration sufficient that upon application of the composition the said sulfoxide is effective to cause defoliation.

14. A plant defoliant composition containing di-n-butyl sulfoxide dissolved in a hydrocarbon solvent carrier in a concentration sufficient that upon application of the composition the said sulfoxide is effective to cause defoliation.

15. A plant defoliant composition containing di-n-dodecyl sulfoxide dissolved in a hydrocarbon solvent carrier in a concentration sufficient that upon application of the composition the said sulfoxide is effective to cause defoliation.

16. A plant defoliant composition containing di-isopropyl sulfoxide dissolved in a hydrocarbon solvent carrier in a concentration sufficient that upon application of the composition the said sulfoxide is effective to cause defoliation.

17. A plant defoliant containing a minor proportion of a compound from the group of compounds which can be represented by the general formulae (1)

and (2)

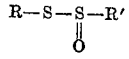

wherein R and R' are selected from the group consisting of the non-halogen containing radicals alkyl, cycloalkyl, aryl, alkaryl and aralkyl groups containing not more than 12 carbon atoms and $m$ is an integer from the group of 1 and 2 in admixture with a hydrocarbon carrier consisting essentially of an HF heavy alkylate obtained by HF-catalyzed alkylation of paraffins with olefins to produce isoparaffinic hydrocarbons.

18. A plant defoliant composition containing a minor proportion of a compound from the group of compounds which can be represented by the general formulae (1)

and (2)

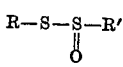

wherein R and R' are selected from the group consisting of the non-halogen containing radicals alkyl, cycloalkyl, aryl, alkaryl and aralkyl groups containing not more than 12 carbon atoms and $m$ is an integer from the group of 1 and 2 in admixture with a dust carrier.

19. A plant defoliant composition containing a minor proportion of a compound from the group of compounds which can be represented by the general formulae:

(1) 

and (2) 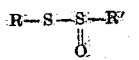

wherein R and R' are selected from the group consisting of the non-halogen containing radicals alkyl, cycloalkyl, aryl, alkaryl and aralkyl groups containing not more than 12 carbon atoms and $m$ is an integer from the group of 1 and 2 in admixture with water and an emulsifying agent.

LYLE D. GOODHUE.
CAROLYN E. TISSOL.

References Cited in the file of this patent

Chemical Abstracts, vol. 20 (1926) Col. 1784² — abstract of article in Industrial and Engineering Chemistry, vol. 18, pages 169 to 171.

U. S. Dept. Agriculture, Bureau of Entomology and Plant Quarantine Bull. No. E-585—January 1943, pages 1 and 11.

U. S. Dept. Agriculture, Circular No. 523, May 1939, pages 1, 2, 3 and 6.